(12) United States Patent
Walter et al.

(10) Patent No.: US 8,011,719 B2
(45) Date of Patent: Sep. 6, 2011

(54) BODY STRUCTURE FOR A MOTOR VEHICLE

(75) Inventors: Siegfried Walter, Leonberg (DE); Jan Christian Sträter, Wiernsheim-Serres (DE); Holger Hahlweg, Calw (DE); Roberto Oggianu, Leonberg (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 305 days.

(21) Appl. No.: 12/427,241

(22) Filed: Apr. 21, 2009

(65) Prior Publication Data

US 2009/0289475 A1   Nov. 26, 2009

(30) Foreign Application Priority Data

May 21, 2008   (DE) .......................... 10 2008 024 702

(51) Int. Cl.
*B60J 7/00* (2006.01)
(52) U.S. Cl. .............. 296/203.04; 296/198; 296/193.08; 296/193.07; 296/187.08
(58) Field of Classification Search .................. 296/198, 296/193.08, 203.04, 203.01, 193.07, 187.08
See application file for complete search history.

(56) References Cited

U.S. PATENT DOCUMENTS

| 5,228,741 A * | 7/1993 | Ide ............................ 296/187.11 |
| 5,782,525 A | 7/1998 | Honma et al. |
| 6,273,498 B1 | 8/2001 | Hillman et al. |
| 2007/0138837 A1 | 6/2007 | Tomioka |
| 2010/0133879 A1 * | 6/2010 | Leonetti et al. .......... 296/193.08 |

FOREIGN PATENT DOCUMENTS

| DE | 19532004 A1 | 3/1996 |
| DE | 197 37 740 A1 | 3/1999 |
| DE | 10348354 A1 | 6/2005 |
| DE | 102004016849 A1 | 11/2005 |
| DE | 102006012628 A1 | 9/2007 |
| DE | 102006016607 A1 | 10/2007 |

OTHER PUBLICATIONS

German Search Report dated May 5, 2009.

* cited by examiner

*Primary Examiner* — Joseph D Pape

(57) ABSTRACT

An inner gusset plate is connected, in each case in the region of the C pillar, to a roof frame cross-member, to a lateral roof frame member and to a rear sealing channel cheek of a motor vehicle or of a rear part of a motor vehicle. The inner gusset plate is arranged opposite a further, outer, connected gusset plate. The two gusset plates form a pillar profile and are connected to a wheel box of the body structure. The inner gusset plate is supported via adjoining inner brackets on a longitudinal member of the vehicle, which longitudinal member is adjoined by two cross-members in the vehicle floor, which cross-members are arranged in the region of the supporting base of the inner bracket on the longitudinal member.

10 Claims, 8 Drawing Sheets

BODY STRUCTURE FOR A MOTOR VEHICLE

CROSS-REFERENCE TO RELATED APPLICATION

This application claims the priority, under 35 U.S.C. §119, of German application DE 10 2008 024 702.2, filed May 21, 2008; the prior application is herewith incorporated by reference in its entirety.

BACKGROUND OF THE INVENTION

Field of the Invention

The invention relates to a body structure for a motor vehicle, in particular for a rear part of a motor vehicle. The body structure includes a roof frame cross-member with lateral front roof frame members connected in each case on the end sides and with rear sealing channel cheeks, and a C pillar being connected to the members at a junction point and being fastened in each case to a wheel house. Floor-side cross-members which are connected to longitudinal members of the vehicle extend between the C pillars.

Published, non-prosecuted German patent application DE 197 37 740 A1, corresponding to U.S. Pat. No. 6,273,498, discloses a self-supporting body for a vehicle with hollow-profile member parts which form two U frames which are arranged consecutively in the longitudinal direction of the vehicle and are supplemented by vehicle body pillars and floor sections.

SUMMARY OF THE INVENTION

It is accordingly an object of the invention to provide a body structure for a motor vehicle, in particular for a rear part of a motor vehicle, that overcomes the above-mentioned disadvantages of the prior art devices of this general type, with which torsional rigidity of the vehicle or of the rear part of the vehicle in the region of the C pillars is to be improved and a specific force flux is to be achieved in the region.

With the foregoing and other objects in view there is provided, in accordance with the invention, a body structure. The body structure contains wheel houses, rear sealing channel cheeks, lateral front roof frame members, and a roof frame cross-member having end sides in each case connected to the lateral front roof frame members and further connected to the rear sealing channel cheeks. C pillars are provide and each is connected to the roof frame cross-member and one of the lateral front roof frame members at a junction point and are fastened in each case to one of the wheel houses. A vehicle floor is provided and has floor-side cross-members extending between the C pillars and connected to longitudinal members. Inner gusset plates are each connected to the roof frame cross-member, to one of the lateral roof frame members and to one of the rear sealing channel cheeks in a region of one of the C pillars. Outer gusset plates are provided with one of the outer gusset plates being disposed opposite each of the inner gusset plates. The inner and outer gusset plates form a pillar profile and are fastened to one of the wheel houses. Each of the inner gusset plates is held via adjoining inner brackets on the longitudinal member. The floor-side cross-members are two mutually spaced-apart cross-members in the vehicle floor disposed adjoining the supporting base of one of the inner brackets on one of the longitudinal members. Each of the longitudinal members are adjoined by the two mutually spaced-apart cross-members.

According to the invention, it is proposed that an inner gusset plate is connected to the roof frame cross-member and the lateral roof frame members and to the rear sealing channel cheeks in the region of the C pillar. The inner gusset plate is arranged opposite a further, outer gusset plate, and the two gusset plates form a "pillar profile" and are fastened to a wheel house of the body structure, with the inner gusset plate being supported via adjoining inner brackets on a longitudinal member of the vehicle. The longitudinal member is adjoined by two cross-members in the vehicle floor, which cross-members are arranged in the region of the supporting base of the inner bracket on the longitudinal member or adjoining the supporting base. An encircling, C-shaped strength bond is formed with the roof frame cross-member and the gusset plates, which form a pillar profile, and with the inner brackets, with a first upper force flux running through the pillars and the roof frame cross-member, and a further lower force flux being divided between two cross-members in the floor region. The reinforcement of the C pillar by the opposite gusset plates, which substantially form a hollow profile, and the connection of the gusset plates to the wheel house or the inner bracket on the longitudinal member result in the production, together with the roof frame cross-member, of a C-shaped strength bond via which optimum torsional rigidity of the vehicle body or of the rear part can be obtained in the region of the C pillars.

The lower inner bracket is fastened locally to the longitudinal member of the vehicle in such a manner that cross-members leading on further in the floor structure on both sides of the inner bracket can be connected directly thereto. This design of the body structure of the rear part with C pillars which are reinforced via the gusset plates, and are connected to the roof frame cross-member and to the two floor cross-members adjoining the inner bracket advantageously results in the specific profile of the upper force flux via the two C pillars and the roof frame cross-member.

The inner gusset plate extends in each case with protruding connection formations over the lateral roof frame member, over the front roof frame cross-member, over the rear sealing channel cheeks and over the inner bracket. This configuration permits optimum connection for fastening purposes and precise positioning with respect to the body parts of the vehicle.

The upper inner bracket is connected to the inner gusset plate at the edge, with the adjoining, lower inner bracket being supported by a lower edge on the inner wheel box half and extending as far as the connecting line of the intersecting wheel box halves. This results in the inner gusset plate being supported on the wheel box, thus creating a rigid pillar bond.

The lower inner bracket extends in a curved manner over the inner wheel box half and is connected thereto in contact with lateral edges and has, on the end sides, two vertical supporting struts which are aligned with a longitudinal member of the vehicle and are arranged in common perpendicular planes with the cross-members in the vehicle floor. The locally close allocation of the supporting struts of the inner bracket to the two cross-members in the floor region of the body structure produces a strength bond which enables forces to be absorbed or the specific, two-part force flux in the floor region of the motor vehicle.

Overall, the two opposite gusset plates form a reinforcement of the C pillar, the gusset plates being formed over the height in such a manner that hollow profiles of differing cross section are produced. Thus, in a perpendicular pillar central transverse plane, the two gusset plates are held on the upper side together on the roof frame cross-member, with a lower end of the outer gusset plate being fastened in the connecting region of the outer wheel box half to the inner wheel box half, and the inner gusset plate being fastened by the connected inner bracket, with a lower end spaced apart from the connecting region, to the inner wheel box half.

Furthermore, in a perpendicular central transverse plane, a front formation of the inner gusset plate produces, together with the outer gusset plate, a reinforcing profile, the end sides of which are connected to each other, and which can be fastened both to the roof and to an outer side wall. The lower connection of the gusset plates takes place on the wheel box with a relatively large base, i.e. the lower connections to the wheel box are spaced apart from each other. Also at the lateral roof frame member in the roof region, hollow profiles are formed by the two gusset plates, with the roof or the side wall being connected thereto.

Other features which are considered as characteristic for the invention are set forth in the appended claims.

Although the invention is illustrated and described herein as embodied in a body structure for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
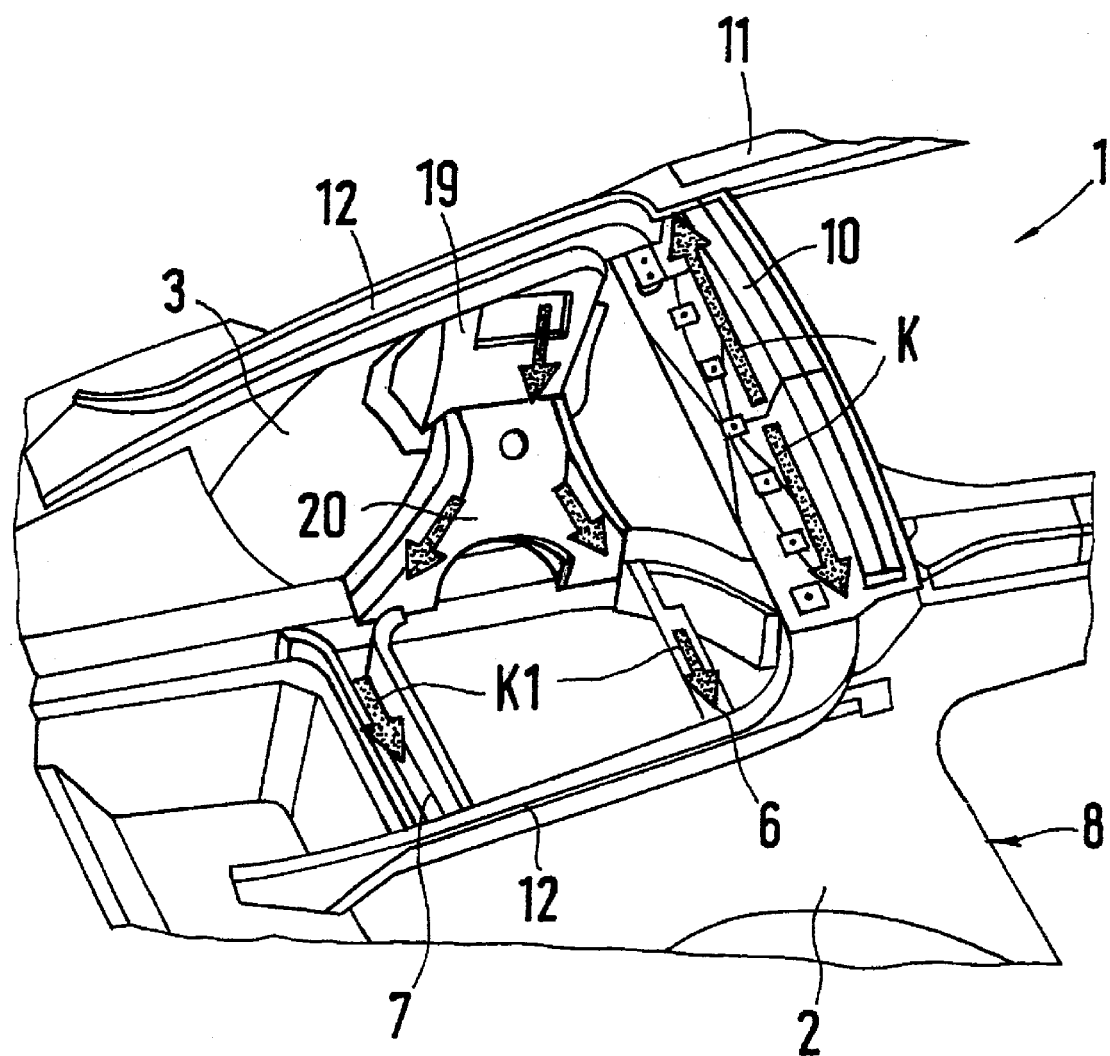
FIG. 1 is a diagrammatic, perspective view of a rear part of a motor vehicle with a roof frame cross-member, lateral roof frame members, sealing channel cheeks, two floor cross-members and a reinforced C pillar, according to the invention.
Figure 2:
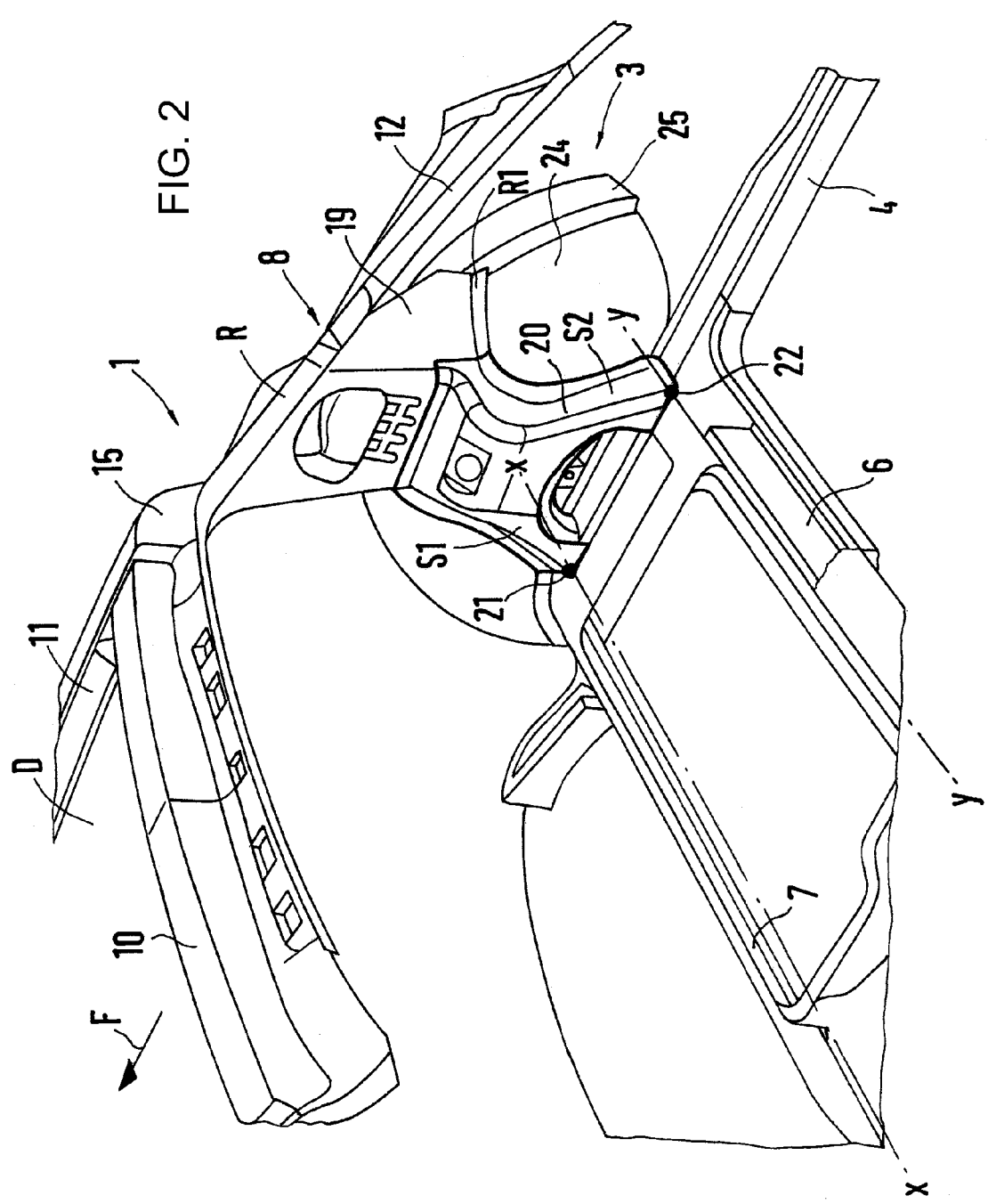
FIG. 2 is an enlarged diagrammatic, perspective view of the arrangement of an inner gusset plate with an inner bracket, the roof frame cross-member and the two floor cross-members.

Referring now to the figures of the drawing in detail and first, particularly, to FIGS. 1 and 2 thereof, there is shown the body structure of a motor vehicle, in particular for a rear part 1 of a motor vehicle, which essentially has side walls 2 and wheel boxes or houses 3, which are arranged between the latter, and also longitudinal members 4 of the vehicle and a floor assembly with two cross-members 6 and 7 of the vehicle. A C pillar 8 of the rear part 1 is formed in each case by hollow profiles which are connected to one another via a roof frame cross-member 10, wherein the latter is adjoined by forwardly extending lateral roof frame members 11 and rearwardly extending sealing channel cheeks 12 are provided for receiving a tailgate.

Figure 3:
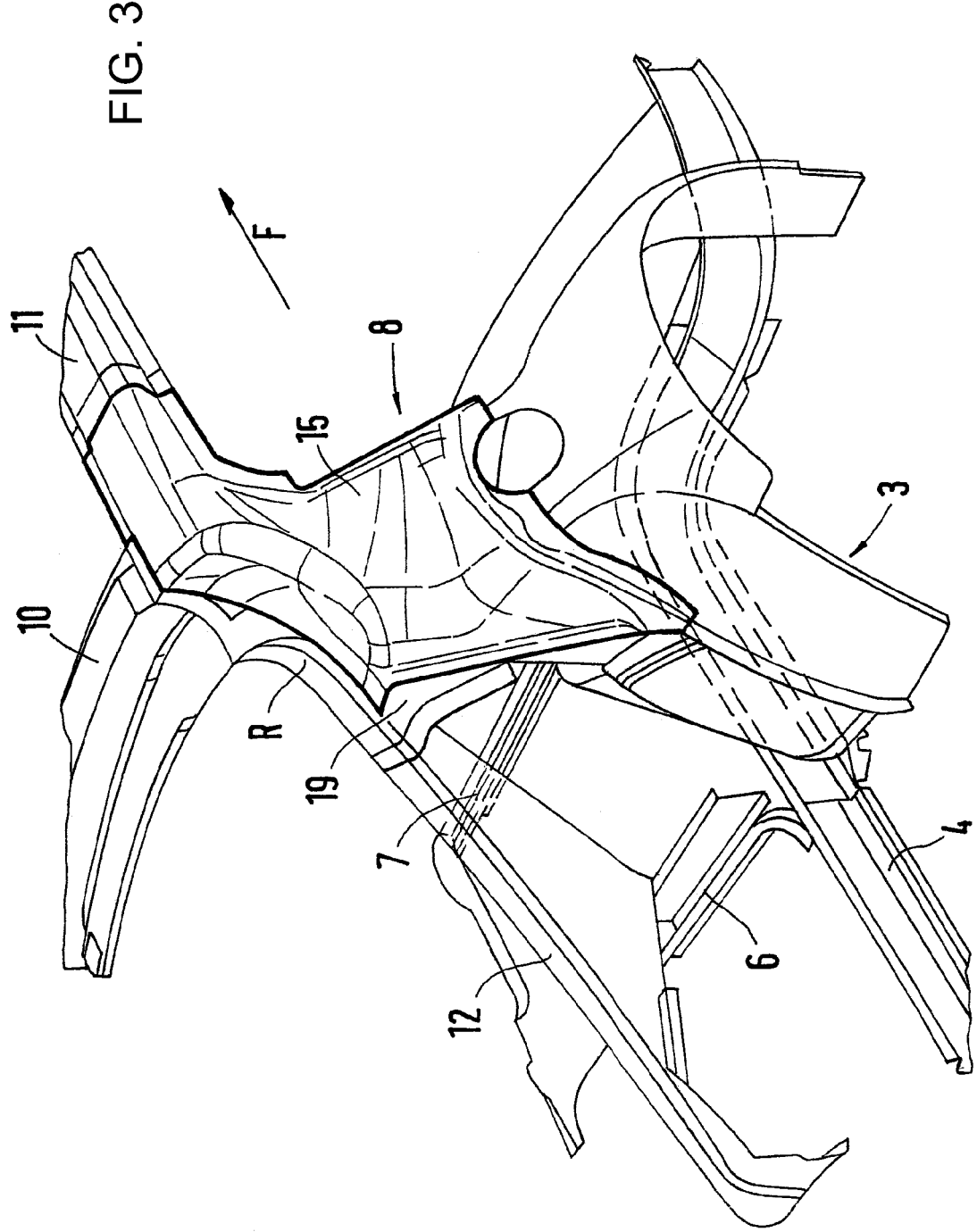
FIG. 3 is a diagrammatic, perspective view of an outer gusset plate.
Figure 4:
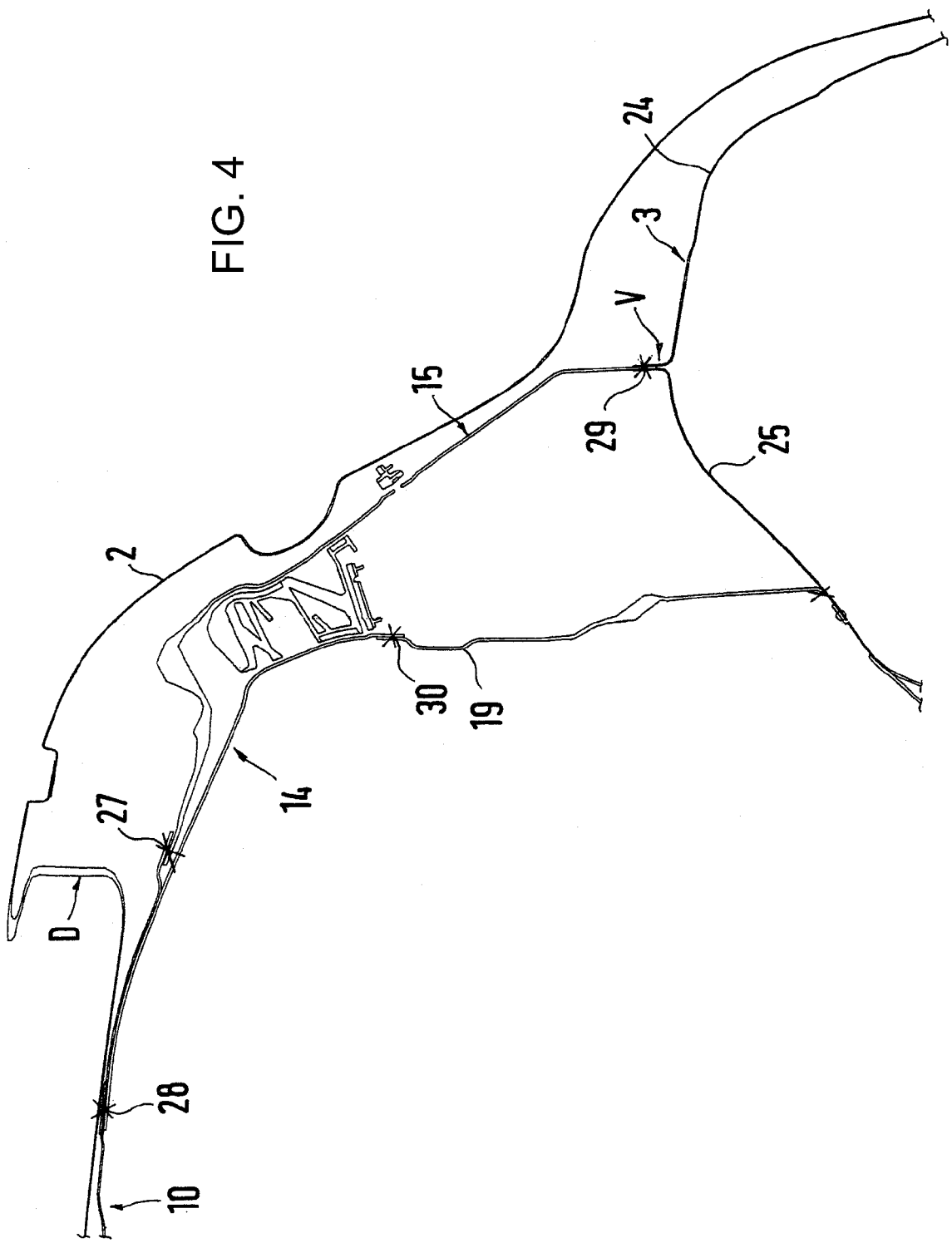
FIG. 4 is a diagrammatic, sectional view through the outer and inner gusset plates taken along the line IV-IV shown in FIG. 6.
Figure 5:
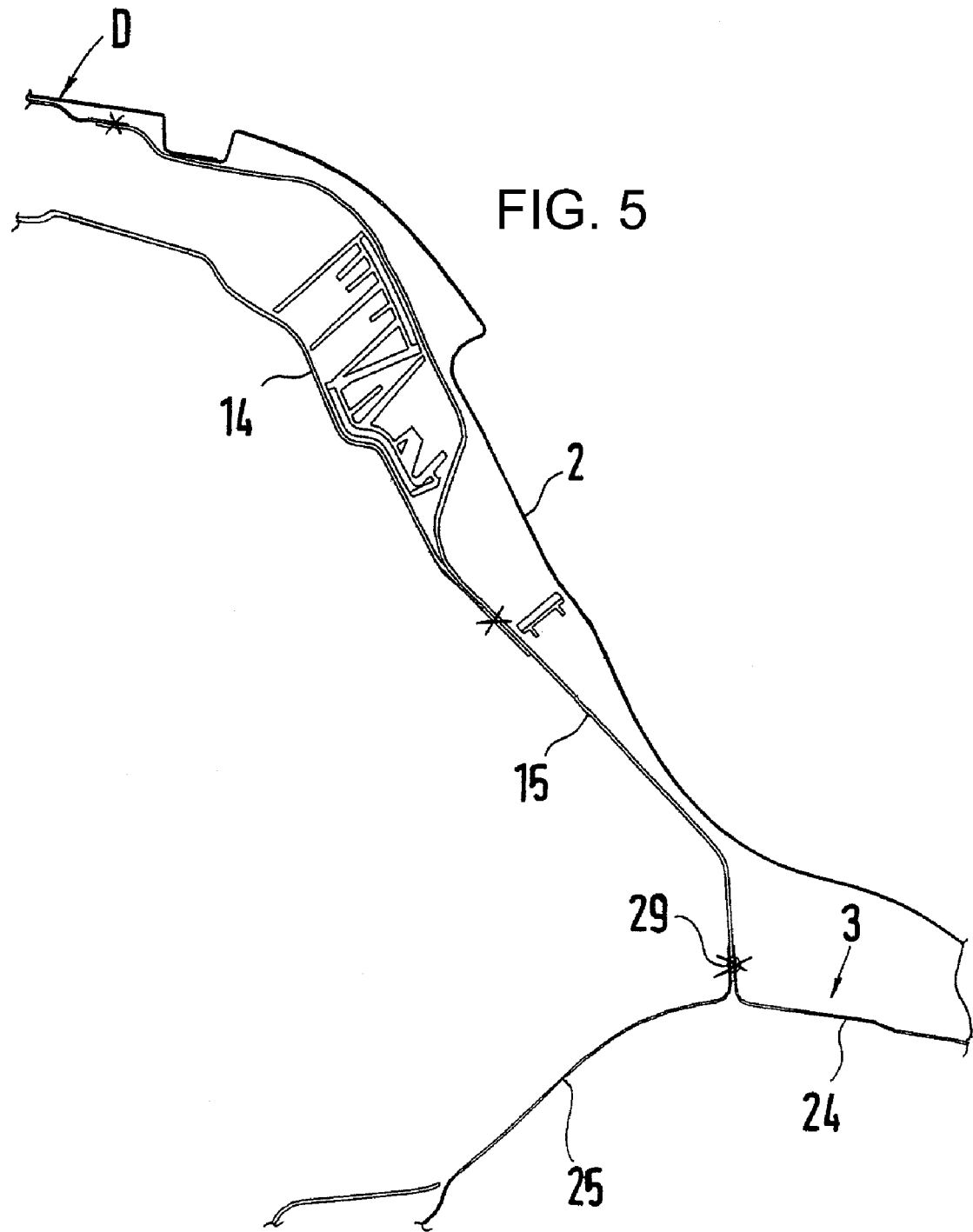
FIG. 5 is a diagrammatic, sectional view through the gusset plates taken along the line V-V shown in FIG. 6.

The C pillar 8 of the body structure of the rear part 1 is substantially reinforced by an inner gusset plate 14 and an opposite, outer, further gusset plate 15 (FIGS. 3-5). The inner gusset plate 14 is connected to an upper inner bracket 19 which, in turn, is connected to a further, lower inner bracket 20 as a supporting element (FIG. 2).

Figure 6:
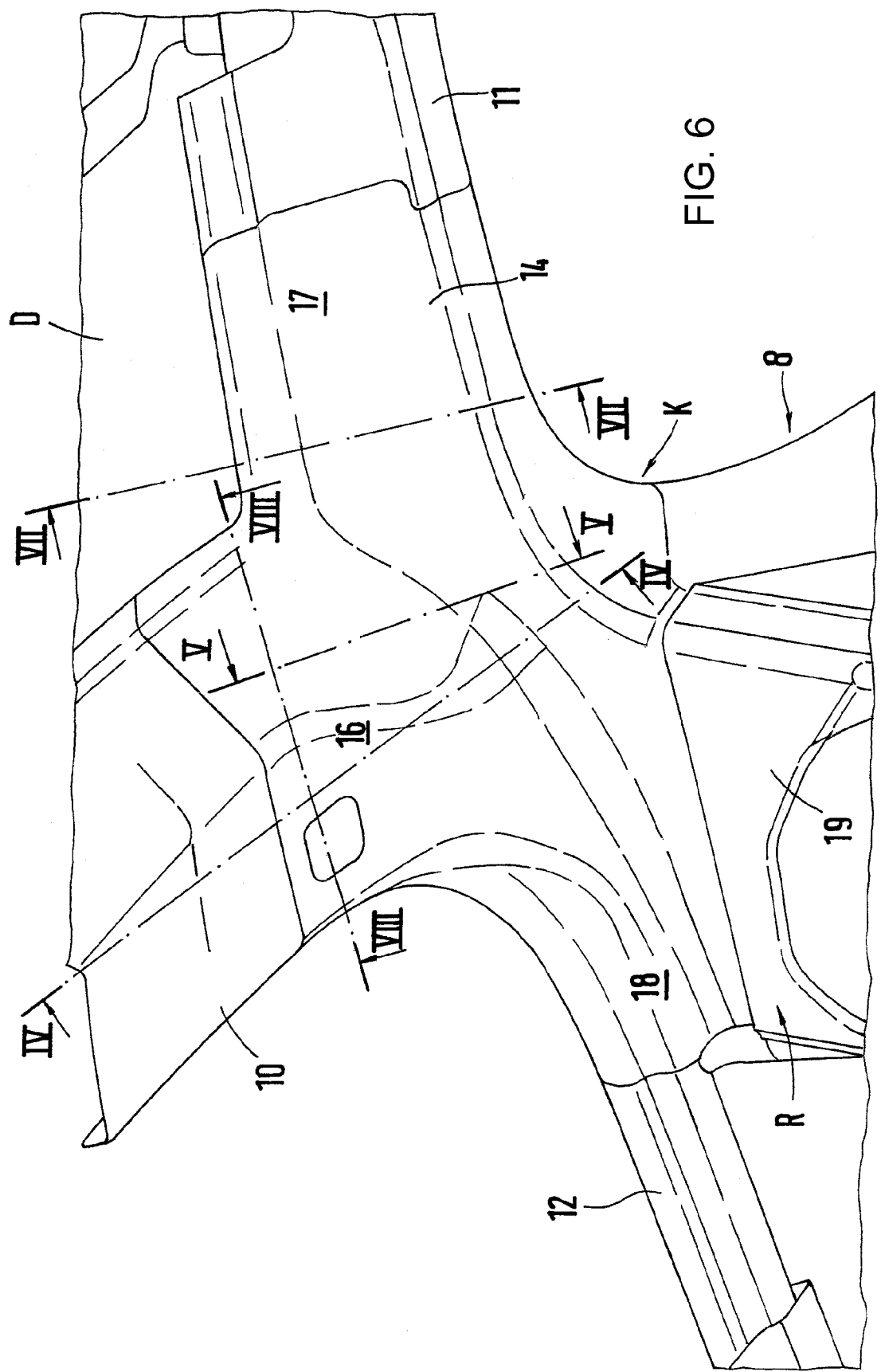
FIG. 6 is a diagrammatic, perspective view of the body structure together with the inner gusset plate, as seen from the inside and from below.

The outer gusset plate 15 extends from the wheel box 3 over the lateral roof frame member 11 and the rear sealing channel cheeks 12 and the roof frame cross-member 10. The inner gusset plate 14 is connected to the upper inner bracket 19 which is held on an adjoining, further, lower inner bracket 20 which forms a supporting element. The inner gusset plate 14 has a plurality of protruding formations 16, 17 and 18 which produce a bond with the roof frame cross-member 10, the lateral roof frame member 11 and the sealing channel cheeks 12 and also with the inner brackets 19, 20 (FIG. 6).

The lower inner bracket 20 has supporting struts S1 and S2 and is connected via the latter to the longitudinal member 4 of the vehicle, to which longitudinal member are fastened the two cross-members 6, 7 which extend in identical perpendicular transverse planes x-x and y-y with the supporting struts S1 and S2 in the supporting points 21, 22 of the inner bracket 20 on the longitudinal member 4. By this configuration, a first upper force flux K is produced via the C pillars 8 and via the roof frame cross-member 10, and a second lower force flux K1 is divided between the two cross-members 6, 7 and between the longitudinal members 4 of the vehicle, as the arrows indicate in more detail in FIG. 1.

The one upper inner bracket 19 is connected by an upper edge R to the rear sealing channel cheek 12 and the roof frame cross-member 10 and to the inner gusset plate 14, and is supported by a further edge R1 on the wheel box 8 and is fastened to the latter.

The further, lower inner bracket 20, which adjoins the upper inner bracket 19 and is configured as a supporting element, extends in a curved manner over an inner wheel box half 25 and is connected to the upper inner bracket 19 approximately in a connecting line V from the inner wheel box half 25 to the outer wheel box half 24.

As illustrated in FIG. 4 in a vertical section through a junction section K in the intersecting region of the roof frame cross-member 10, the lateral roof frame member 11 and the rear sealing channel cheek 12, the inner gusset plate 14 is connected to the roof frame cross-member 10 and to the outer gusset plate 15 in regions 27 and 28. The outer gusset plate 15 is fastened in the connecting region 29 of the two wheel box halves 24 and 25. The inner gusset plate 14 is connected at the connecting point 30 to the inner bracket 19 and the latter is fastened to the inner wheel box half 25.

FIG. 5 shows a vertical section in the transverse direction through the junction section K, in which the gusset plates 14, 15 in a roof region D and in the region of the roof frame form a hollow profile, and the outer gusset plate 15 extends as far as the wheel box 3 and is connected thereto.

Figure 7:
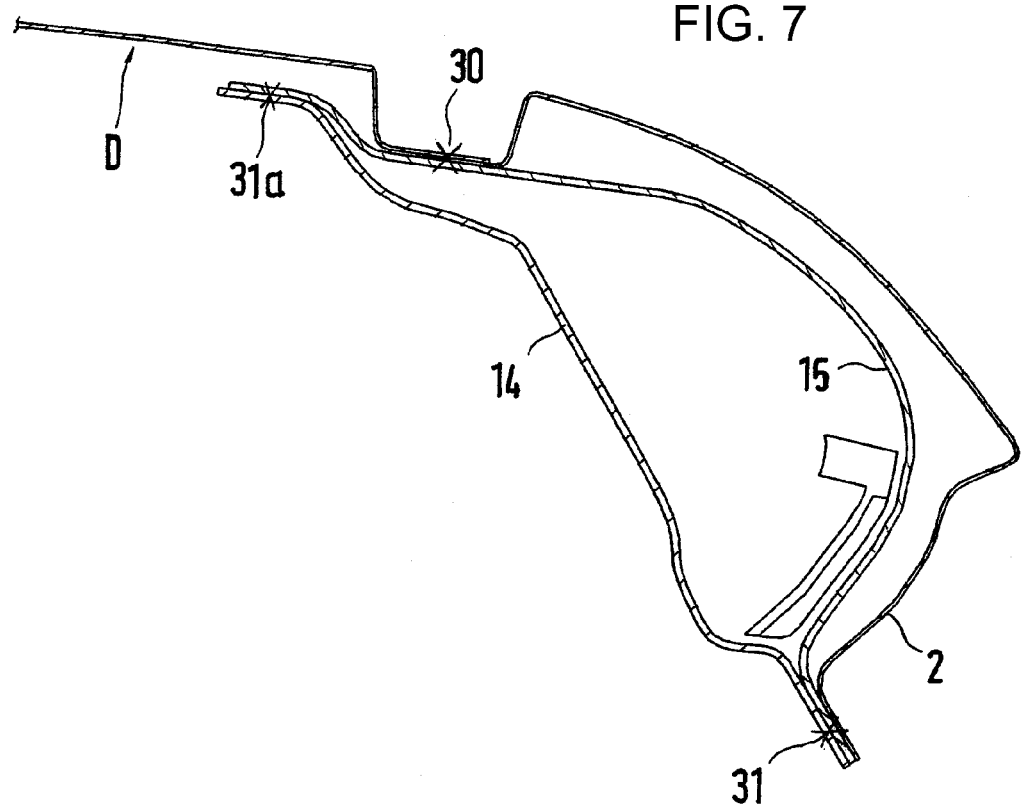
FIG. 7 is a diagrammatic, sectional view in a region of the lateral roof frame taken along the line VII-VII shown in FIG. 6.

FIG. 7 shows a vertical section through the inner gusset plate 14 and through the formation of the outer gusset plate 15 in the region of the lateral roof frame member 11. In this case too, the two gusset plates 14, 15 form a hollow member profile which reinforces the C pillar and is enclosed on the outside by the side wall 2. The gusset plates 14, 15 are connected in an intersecting region 30 to the roof D and in the region 31 to the side wall 2.

Figure 8:
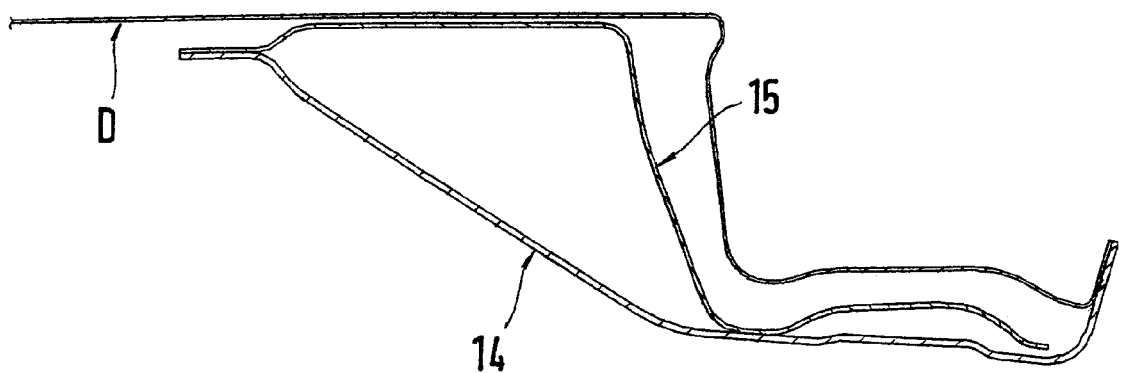
FIG. 8 is a diagrammatic, sectional view in a region of the roof frame cross-member and taken along the line VIII-VIII shown in FIG. 6.
Figure 9:
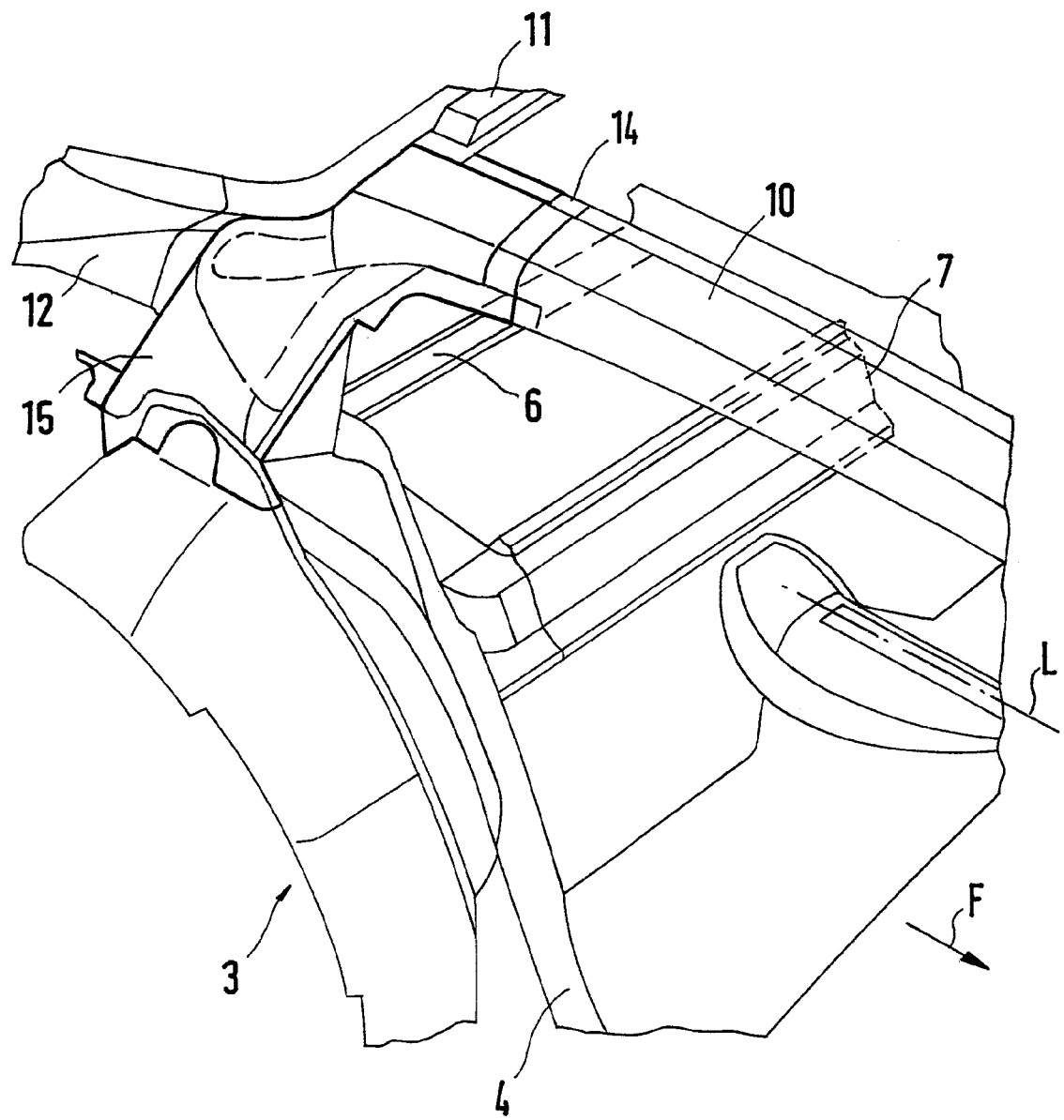
FIG. 9 is a diagrammatic, perspective view of the outer gusset plate together with the inner gusset plate.

FIG. 8 shows a vertical section through the inner gusset plate 14 and through the formation 16 on the outer gusset plate 15. The two gusset plates 14, 15 form a hollow member profile which extends in the roof region D.

The invention claimed is:

1. A body structure, comprising:
   wheel houses;
   rear sealing channel cheeks;
   lateral front roof frame members;
   a roof frame cross-member having end sides in each case connected to said lateral front roof frame members and further connected to said rear sealing channel cheeks;
   C pillars each connected to said roof frame cross-member and one of said lateral front roof frame members at a junction point and being fastened in each case to one of said wheel houses;
   longitudinal members;
   a vehicle floor having floor-side cross-members extending between said C pillars and connected to said longitudinal members;
   inner gusset plates each connected to said roof frame cross-member, to one of said lateral roof frame members and to one of said rear sealing channel cheeks in a region of one of said C pillars;
   inner brackets having a supporting base;
   outer gusset plates, one of said outer gusset plates disposed opposite each of said inner gusset plates, said inner and outer gusset plates forming a pillar profile and being fastened to one of said wheel houses, each of said inner gusset plates being held via adjoining said inner brackets on said longitudinal member; and
   said floor-side cross-members being two mutually spaced-apart cross-members in said vehicle floor disposed adjoining said supporting base of one of said inner brackets on one of said longitudinal members, each of said longitudinal members adjoined by said two mutually spaced-apart cross-members.

2. The body structure according to claim 1, wherein said roof frame cross-member together with said inner and outer gusset plates, which form said pillar profile, and said inner brackets form an encircling, C-shaped strength bond with a first, upper force flux, and a second lower force flux is divided between said two cross-members, which are connected to said longitudinal members in said vehicle floor.

3. The body structure according to claim 1, wherein said inner gusset plates extend in each case with protruding connection formations over said lateral roof frame members, said roof frame cross-member, said rear sealing channel cheeks and over one of said inner brackets.

4. The body structure according to claim 1, wherein:
   each of said wheel houses have an inner wheel box half and an outer wheel box half; and
   said inner brackets include a lower inner bracket and an upper inner bracket, said upper inner bracket has an edge connected to one of said inner gusset plates and is held by an adjoining said lower inner bracket on said inner wheel box half, with said lower inner bracket extending as far as a connecting line intersecting said inner and outer wheel box halves.

5. The body structure according to claim 4, wherein said lower inner bracket extends in a curved manner over said inner wheel box half, is connected thereto in contact with lateral edges of the inner wheel box half and has, on end sides, two vertical supporting struts which are aligned with one of said longitudinal members and are disposed in common perpendicular planes with said floor-side cross-members.

6. The body structure according to claim 4, wherein in a perpendicular pillar central transverse plane, said inner and outer gusset plates are held on a top side together on said roof frame cross-member, with a lower end of said outer gusset plate being fastened in a connecting region of said outer wheel box half to said inner wheel box half, and said inner gusset plate being fastened by said connected upper inner bracket, with a lower end at a distance from said connecting region, to said inner wheel box half.

7. The body structure according to claim 1, wherein in a perpendicular central transverse plane, said inner gusset plate has a front formation, with respect to a direction of travel, which produces, together with said outer gusset plate, a reinforcing profile, end sides of which are connected to each other at free ends in intersecting regions, and which can be fastened both to a roof and also to an outer side wall of a vehicle.

8. The body structure according to claim 3, further comprising a roof frame panel, and, in a perpendicular vehicle longitudinal central plane in a region of said roof frame cross-member, said inner gusset plate is connected to said roof frame panel by one of said protruding connection formations which extends with respect to a vehicle longitudinal central axis.

9. The body structure according to claim 1, wherein in a perpendicular plane through said inner and outer gusset plates and through said roof frame cross-member, a hollow profile is formed from said inner and outer gusset plates in a roof region, and only said outer gusset plate is guided further and connected to one of said wheel houses.

10. The body structure according to claim 1, wherein the body structure is for a rear part of a motor vehicle.

* * * * *